United States Patent
Kloeppner et al.

(10) Patent No.: US 8,928,966 B1
(45) Date of Patent: Jan. 6, 2015

(54) ELECTROCHROMIC POLYELECTROLYTE GEL MEDIUM HAVING IMPROVED CREEP RESISTANCE AND ASSOCIATED ELECTROCHROMIC DEVICE

(71) Applicant: Gentex Corporation, Zeeland, MI (US)

(72) Inventors: Leroy J. Kloeppner, Jenison, MI (US); Punam Giri, Holland, MI (US); Rongguang Lin, Holland, MI (US); David A. Theiste, Byron Center, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 13/961,375

(22) Filed: Aug. 7, 2013

Related U.S. Application Data

(60) Provisional application No. 61/680,775, filed on Aug. 8, 2012.

(51) Int. Cl.
  *G02F 1/153* (2006.01)
  *H01M 6/14* (2006.01)
  *G02F 1/157* (2006.01)

(52) U.S. Cl.
  CPC .............. *G02F 1/153* (2013.01); *G02F 1/157* (2013.01)
  USPC ......................................... 359/273; 429/300

(58) Field of Classification Search
  CPC . G02F 1/153; G02F 1/1533; G02F 2202/023; H01M 10/052; H01M 10/0565; H01B 1/122; H01G 11/56; C08F 8/14
  USPC ........... 359/265, 270, 273, 275; 429/300, 303
  See application file for complete search history.

(56) References Cited

U.S. PATENT DOCUMENTS

| | | | |
|---|---|---|---|
| 4,297,401 A | 10/1981 | Chern et al. |
| 4,418,102 A | 11/1983 | Ferrato |
| 4,695,490 A | 9/1987 | McClelland et al. |
| 4,902,108 A | 2/1990 | Byker |
| 5,596,023 A | 1/1997 | Tsubota et al. |
| 5,596,024 A | 1/1997 | Horie et al. |
| 5,805,330 A | 9/1998 | Byker et al. |
| 5,818,625 A | 10/1998 | Forgette et al. |
| 5,928,572 A | 7/1999 | Tonar et al. |
| 5,940,201 A | 8/1999 | Ash et al. |
| 5,998,617 A | 12/1999 | Srinivasa et al. |
| 6,020,987 A | 2/2000 | Baumann et al. |
| 6,037,471 A | 3/2000 | Srinivasa et al. |
| 6,137,620 A | 10/2000 | Guarr et al. |
| 6,141,137 A | 10/2000 | Byker et al. |
| 6,157,480 A | 12/2000 | Anderson et al. |
| 6,188,505 B1 | 2/2001 | Lomprey et al. |

(Continued)

FOREIGN PATENT DOCUMENTS

| WO | PCT/US98/05570 | 3/1998 |
|---|---|---|
| WO | PCT/EP98/03862 | 6/1998 |

*Primary Examiner* — David N Spector
(74) *Attorney, Agent, or Firm* — Foley & Lardner LLP; Scott P. Ryan

(57) ABSTRACT

An electrochromic device including a first substantially transparent substrate having an electrically conductive material associated therewith; a second substrate having an electrically conductive material associated therewith; and an electrochromic medium contained within a chamber positioned between the first and second substrates which includes: at least one solvent; at least one anodic electroactive material; at least one cathodic electroactive material; wherein at least one of the anodic and cathodic electroactive materials is electrochromic; and a creep resistant crosslinked polyelectrolyte gel matrix.

24 Claims, 4 Drawing Sheets

(56) References Cited

U.S. PATENT DOCUMENTS

| | | |
|---|---|---|
| 6,193,912 B1 | 2/2001 | Thieste et al. |
| 6,239,898 B1 | 5/2001 | Byker et al. |
| 6,241,916 B1 | 6/2001 | Claussen et al. |
| 6,242,602 B1 | 6/2001 | Giri et al. |
| 6,249,369 B1 | 6/2001 | Theiste et al. |
| 6,262,832 B1 | 7/2001 | Lomprey et al. |
| 6,268,950 B1 | 7/2001 | Ash et al. |
| 6,288,825 B1 | 9/2001 | Byker et al. |
| 6,351,328 B1 | 2/2002 | Byker |
| 6,362,914 B2 | 3/2002 | Baumann et al. |
| 6,392,783 B1 | 5/2002 | Lomprey et al. |
| 6,407,847 B1 | 6/2002 | Poll et al. |
| 6,433,914 B1 | 8/2002 | Lomprey et al. |
| 6,445,486 B1 | 9/2002 | Lomprey et al. |
| 6,519,072 B2 | 2/2003 | Nishikitani et al. |
| 6,525,861 B1 | 2/2003 | Roberts et al. |
| 6,545,794 B2 | 4/2003 | Ash et al. |
| 6,567,708 B1 | 5/2003 | Bechtel et al. |
| 6,597,489 B1 | 7/2003 | Guarr et al. |
| 6,614,578 B2 | 9/2003 | Giri et al. |
| 6,635,194 B2 | 10/2003 | Kloeppner et al. |
| 6,697,185 B2 | 2/2004 | Lomprey et al. |
| 6,700,692 B2 | 3/2004 | Tonar et al. |
| 6,700,693 B2 | 3/2004 | Roberts et al. |
| 6,710,906 B2 | 3/2004 | Guarr et al. |
| 6,714,334 B2 | 3/2004 | Tonar |
| 6,876,479 B1 | 4/2005 | Giri et al. |
| 6,934,067 B2 * | 8/2005 | Ash et al. ............... 359/273 |
| 7,001,540 B2 | 2/2006 | Kloeppner et al. |
| 7,046,418 B2 | 5/2006 | Lin et al. |
| 7,085,609 B2 | 8/2006 | Bechtel et al. |
| 7,097,940 B2 * | 8/2006 | Uetani et al. ............ 429/303 |
| 7,193,764 B2 | 3/2007 | Lin et al. |
| 7,256,924 B2 | 8/2007 | Guarr et al. |
| 7,285,360 B2 * | 10/2007 | Maruyama et al. ...... 429/303 |
| 7,372,609 B2 | 5/2008 | Lin et al. |
| 7,372,611 B2 | 5/2008 | Tonar et al. |
| 7,379,225 B2 | 5/2008 | Tonar et al. |
| 7,428,091 B2 | 9/2008 | Baumann et al. |
| 7,508,568 B2 | 3/2009 | Lin et al. |
| 7,517,615 B2 * | 4/2009 | Uetani et al. ............ 429/303 |
| 7,855,821 B2 | 12/2010 | Baumann et al. |
| 7,884,995 B2 | 2/2011 | Tonar et al. |
| 7,990,603 B2 | 8/2011 | Ash et al. |
| 8,345,345 B2 | 1/2013 | Veenman et al. |
| 2013/0235323 A1 * | 9/2013 | Sotzing et al. ............. 351/44 |

* cited by examiner

ELECTROCHROMIC POLYELECTROLYTE GEL MEDIUM HAVING IMPROVED CREEP RESISTANCE AND ASSOCIATED ELECTROCHROMIC DEVICE

CROSS-REFERENCE TO RELATED APPLICATIONS

This application claims the benefit of U.S. Provisional Application Ser. No. 61/680,775, filed Aug. 8, 2012, entitled "Electrochromic Polyelectrolyte Gel Medium Having Improved Creep Resistance and Associated Electrochromic Device," which is hereby incorporated herein by reference in its entirety, including all references cited therein.

BACKGROUND OF THE INVENTION

1. Field of the Invention

The present invention relates in general to electrochromic devices and, more particularly, to electrochromic polyelectrolyte gel mediums, for use in electrochromic devices, having improved creep resistance.

2. Background Art

Electrochromic devices have been known in the art for several years. While the utilization of electrochromic devices, such as electrochromic mirrors, windows, and transparencies has become increasingly popular, for example, among the automotive and aerospace industries, maintaining substantially uniform cell spacing between device substrates remains difficult for certain device configurations, including, but not limited to, large area device configurations. Without being bound to any one particular theory, it is believed that this uniformity change is due in part to a redistribution of the electrochromic device's solvent in the gel medium under the influence of the earth's gravitational force over time. One proposed solution to maintaining substantially uniform cell spacing between substrates has been to increase the amount of network polymer in the gel relative to the solvent in the electrochromic medium. However, this solution can lead to other problems, such as adversely affecting device coloring and/or clearing time, increasing the frequency and magnitude of undesirable thermally induced defects in the electrochromic medium, as well as increasing manufacturing time and difficulty and, in turn, cost.

It has been discovered that selective utilization of creep resistant crosslinked polyelectrolyte gel matrices enable an associated device to maintain substantially uniform cell spacing between device substrates without the above-identified drawbacks associated with increasing the concentration of the polymer network relative to the solvent in the electrochromic medium.

It is therefore an object of the present invention to provide an electrochromic medium for use in an electrochromic device having a crosslinked polyelectrolyte gel matrix with increased creep resistance that improves upon and/or remedies the aforementioned detriments and/or complications associated with the use of conventional electrochromic mediums.

These and other objects of the present invention will become apparent in light of the present specification, claims, and appended drawings.

SUMMARY OF THE INVENTION

The present invention is preferably directed to an electrochromic device, comprising: (a) a first substantially transparent substrate having an electrically conductive material associated therewith; (b) a second substrate which is optionally substantially transparent having an electrically conductive material associated therewith; and (c) an electrochromic medium contained within a chamber positioned between the first and second substrates which comprises: (1) at least one solvent (e.g., propylene carbonate); (2) at least one anodic electroactive material (e.g., ferrocenes such as di-tert-butyl-diethylferrocene, 5,10-dimethyl-5,10-dihydrophenazine (DMP), tetramethylphenazine (TMP)); (3) at least one cathodic electroactive material (e.g., a viologen); (4) wherein at least one of the anodic and cathodic electroactive materials is electrochromic; and (5) a creep resistant crosslinked polyelectrolyte gel matrix.

The present invention is also preferably directed to an electrochromic device, comprising: (a) a first substantially transparent substrate having an electrically conductive material associated therewith; (b) a second substrate having an electrically conductive material associated therewith; and (c) an electrochromic medium contained within a chamber positioned between the first and second substrates which comprises: (1) at least one solvent; (2) at least one anodic electroactive material; (3) at least one cathodic electroactive material; (4) wherein at least one of the anodic and cathodic electroactive materials is electrochromic; and (5) a crosslinked polyelectrolyte gel matrix, wherein the polyelectrolyte gel matrix increases creep resistance of the electrochromic medium relative to the same without the crosslinked polyelectrolyte gel matrix and/or with a neutral (i.e., non-charged) crosslinked gel matrix at same or similar concentrations.

In a preferred embodiment of the present invention, the electrochromic device exhibits an absolute value of percentage change in cell spacing of less than approximately 1.00% after being exposed to 11,000 centrifugal $Gals_{(L)}$ (i.e., Gals generated via centrifuge having a vector substantially parallel to the length of the device) for 500 hours.

In another preferred embodiment of the present invention, the electrochromic device exhibits an absolute value of percentage change in cell spacing of less than approximately 3.75%, and more preferably less than approximately 2.50%, after being exposed to 11,000 centrifugal $Gals_{(L)}$ for 750 hours.

In yet another preferred embodiment of the present invention, the electrochromic device exhibits an absolute value of percentage change in cell spacing of less than approximately 4.00%, and more preferably less than approximately 3.00%, after being exposed to 11,000 centrifugal $Gals_{(L)}$ for 1,000 hours.

In another aspect of the present invention, the electrochromic device exhibits an absolute value of percentage change in cell spacing of less than approximately 6.00%, and more preferably less than approximately 5.00%, after being exposed to 11,000 centrifugal $Gals_{(L)}$ for 1,500 hours.

In a preferred embodiment of the present invention, the electrochromic device exhibits an absolute value of percentage change in cell spacing of less than approximately 8.00%, and more preferably less than approximately 5.00%, after being exposed to 11,000 centrifugal $Gals_{(L)}$ for 1,750 hours.

In accordance with the present invention, the electrochromic medium may also comprise an ultraviolet stabilizer, and/or an anodic and/or a cathodic color-stabilizing redox buffer.

The present invention is further preferably directed to a transparency, comprising: (a) a first substantially transparent substrate having an electrically conductive material associated therewith; (b) a second substantially transparent substrate having an electrically conductive material associated therewith; (c) wherein at least one of the first and second substrates is less than approximately 1 mm thick; and (d) an electrochromic medium contained within a chamber positioned between the first and second substrates which comprises: (1) at least one solvent; (2) at least one anodic electroactive material; (3) at least one cathodic electroactive material; (4) wherein at least one of the anodic and cathodic electroactive materials is electrochromic; (5) at least one ultraviolet stabilizer; (6) an anodic color-stabilizing redox buffer; (7) a cathodic color-stabilizing redox buffer; and (8) a creep resistant crosslinked polyelectrolyte gel matrix.

These and other features, advantages, and objects of the present invention will be further understood and appreciated by those skilled in the art by reference to the following specification, claims, and appended drawings.

BRIEF DESCRIPTION OF THE DRAWINGS

Certain embodiments of the present invention are illustrated by the accompanying figures. It will be understood that the figures are not to scale and that details not necessary for an understanding of the invention or that render other details difficult to perceive have been omitted for pictorial clarity. It will be further understood that the invention is not necessarily limited to the particular embodiments illustrated herein.

The invention will now be described with reference to the drawings wherein.

DETAILED DESCRIPTION OF THE INVENTION

In accordance with the present invention, and as will be shown experimentally herein below, the electrochromic devices include electrochromic mediums which comprise creep resistant crosslinked polyelectrolyte gel matrices that enable associated devices to maintain substantially uniform cell spacing between device substrates—even after being exposed to centrifugal forces for extended periods of time, especially compared to a neutral crosslinked polymer gel network at similar concentrations and/or weight percentages.

Figure 1:
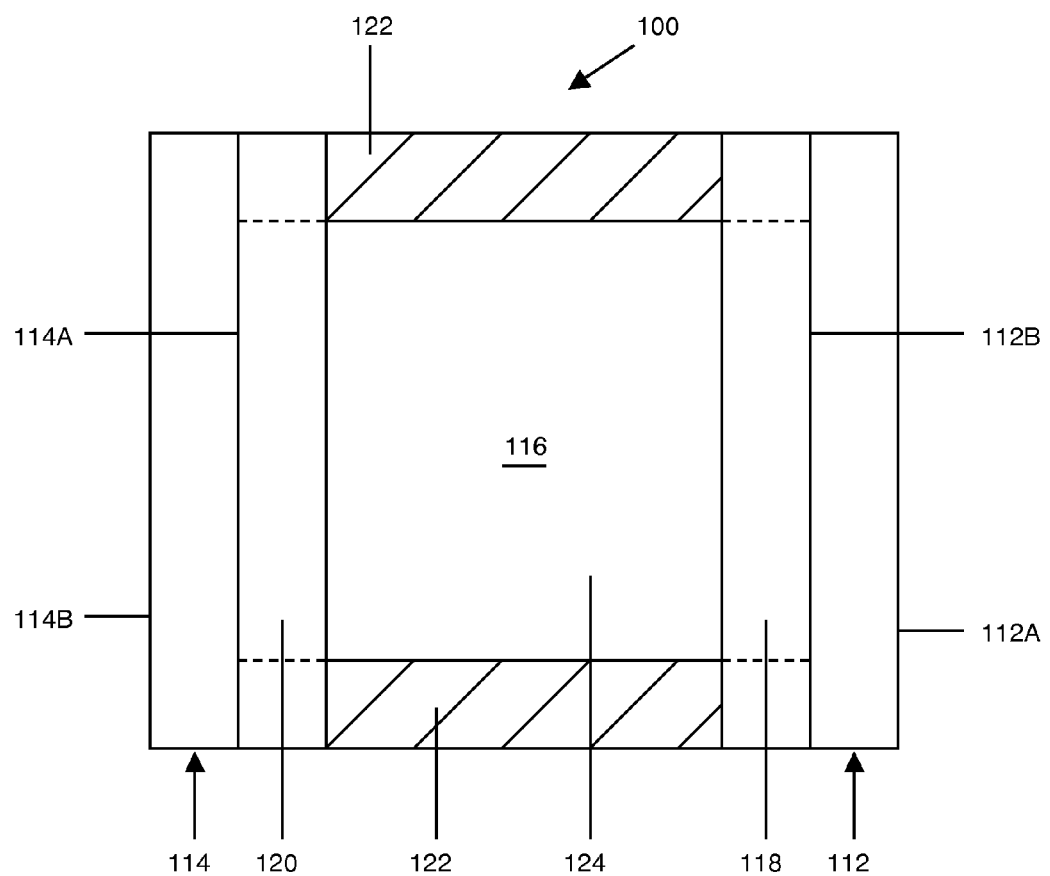
FIG. 1 of the drawings is a cross-sectional, schematic representation of an electrochromic device fabricated in accordance with the present invention.

Referring now to the drawings and to FIG. 1 in particular, a cross-sectional schematic representation of variable transmission electrochromic device 100 is shown, which generally comprises first substrate 112 having front surface 112A and rear surface 112B, second substrate 114 having front surface 114A and rear surface 114B, and chamber 116 for containing electrochromic medium 124. In accordance with the present invention, electrochromic device 100 may comprise, for illustrative purposes only, a mirror, a window, a transparency, a display device, a contrast enhancement filter, and the like. It will be further understood that like or analogous elements and/or components, and/or methods referred to herein, may be identified throughout the drawings with like reference characters. It will be further understood that FIG. 1 is merely a schematic representation of electrochromic device 100. As such, some of the components have been distorted from their actual scale for pictorial clarity. Indeed, numerous other variable transmission electrochromic device configurations, components and/or control systems are contemplated for use, including those disclosed in U.S. Pat. No. 7,990,603 entitled "Variable Transmission Window System," U.S. Pat. No. 7,085,609 entitled "Variable Transmission Window Constructions," U.S. Pat. No. 6,597,489 entitled "Electrode Design For Electrochromic Devices," U.S. Pat. No. 6,567,708 entitled "System To Interconnect, Link, And Control Variable Transmission Windows And Variable Transmission Window Constructions," U.S. Pat. No. 6,433,914 entitled "Color-Stabilized Electrochromic Devices," U.S. Pat. No. 6,407,847 entitled "Electrochromic Medium Having A Color Stability," U.S. Pat. No. 6,239,898 entitled "Electrochromic Structures," U.S. Pat. No. 6,137,620 entitled "Electrochromic Media With Concentration-Enhanced Stability, Process For The Preparation Thereof And Use In Electrochromic Devices," U.S. Pat. No. 5,940,201 entitled "Electrochromic Mirror With Two Thin Glass Elements And A Gelled Electrochromic Medium," U.S. Pat. No. 5,818,625 entitled "Electrochromic Rearview Mirror Incorporating A Third Surface Metal Reflector," U.S. Pat. No. 5,805,330 entitled "Electro-Optic Window Incorporating A Discrete Photovoltaic Device," and U.S. Pat. No. 7,379,225 entitled "Vehicular Rearview Mirror Elements And Assemblies Incorporating These Elements,"— all of which are hereby incorporated herein by reference in their entirety including all references incorporated and/or cited therein.

First substrate 112 may be fabricated from any one of a number of materials that are transparent or substantially transparent in the visible region of the electromagnetic spectrum, such as, for example, borosilicate glass, soda lime glass, natural and synthetic polymeric resins, plastics, and/or composites including polyesters (e.g. PET), polyimides (PI), polycarbonates, glass-clad polycarbonates (GCP) polysulfones, polyamides, polyethylene naphthalate (PEN), ethylene vinyl acetate (EVA), acrylate polymers, as well as Topas®, which is commercially available from Ticona of Summit, N.J. First substrate 112 is preferably fabricated from a sheet of glass having a thickness ranging from approximately 0.10 millimeters (mm) to approximately 12.7 mm, more preferably from approximately 0.50 mm to approximately 1.50 mm, and yet more preferably from approximately 0.60 mm to approximately 1.00 mm. Of course, the thickness of the substrate will depend largely upon the particular application of the variable transmission electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, variable transmission electrochromic devices in accordance with the present invention can be, during normal operation, exposed to extreme temperature variation as well as substantial UV radiation, emanating primarily from the sun. It will be further understood that first substrate 112 and/or second substrate 114 may comprise a UV absorbing layer and/or contain a UV absorbing material to help protect the substrate(s) and/or the electrochromic media from UV damage.

Second substrate 114 may be fabricated from similar materials as that of first substrate 112. Second substrate 114 is preferably fabricated from a sheet of glass or plastic having a thickness ranging from approximately 0.10 mm to approximately 12.7 mm, more preferably from approximately 0.50 mm to approximately 1.50 mm, and yet more preferably from approximately 0.60 mm to approximately 1.00 mm. If first and second substrates 112 and 114, respectively, are fabricated from sheets of glass, then the glass can optionally be tempered, heat strengthened, chemically strengthened, and/or laminated prior to or subsequent to being coated with layers of electrically conductive material (118 and 120).

One or more layers of electrically conductive material 118 are associated with rear surface 112B of first substrate 112. These layers serve as an electrode for the variable transmission electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the variable transmission electrochromic device or the atmosphere; and (e) exhibits minimal diffuse or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium/tin oxide (ITO), doped zinc oxide, indium zinc oxide, metal oxide/Ag/metal oxide (wherein metal oxide comprises metal carbide, metal nitride, metal sulfide, etcetera), or other materials known to those having ordinary skill in the art.

Electrically conductive material 120 is preferably associated with front surface 114A of second substrate 114, and is preferably operatively bonded to electrically conductive material 118 by sealing member 122. As can be seen in FIG. 1, once bonded, sealing member 122 and the juxtaposed portions of electrically conductive materials 118 and 120 serve to generally define an inner peripheral geometry of chamber 116. Alternatively, edge sealing techniques may be utilized which are disclosed in U.S. Pat. No. 7,372,611 entitled "Vehicular Rearview Mirror Elements And Assemblies Incorporating These Elements," which is hereby incorporated herein by reference in its entirety including all references incorporated and/or cited therein.

In accordance with the present invention, the cell spacing between inner surfaces of substrates 112 and 114, which may be associated with electrically conductive materials 118 and 120, respectively, preferably ranges from approximately 10 microns (μm) to approximately 750 μm, and more preferably from approximately 20 μm to approximately 600 μm. However, it will be understood that the thickness of the cell spacing will depend largely upon the particular application of the variable transmission electrochromic device.

Sealing member 122 may comprise any material that is capable of being adhesively bonded to the electrically conductive materials 118 and 120 to, in turn, seal chamber 116 so that electrochromic medium 124 does not inadvertently leak out of the chamber and/or be exposed to the atmosphere. As is shown in dashed lines in FIG. 1, it is also contemplated that the sealing member extend all the way to rear surface 112B and front surface 114A of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. No. 4,297,401 entitled "Liquid Crystal Display And Photopolymerizable Sealant Therefor," U.S. Pat. No. 4,418,102 entitled "Liquid Crystal Displays Having Improved Hermetic Seal," U.S. Pat. No. 4,695,490 entitled "Seal For Liquid Crystal Display," U.S. Pat. No. 5,596,023 entitled "Sealing Material For Liquid Crystal Display Panel, And Liquid Crystal Display Panel Using It," U.S. Pat. No. 5,596,024 entitled "Sealing Composition For Liquid Crystal," U.S. Pat. No. 6,157,480 entitled "Seal For Electrochromic Devices," and U.S. Pat. No. 6,714,334 entitled "Electrochromic Device Having A Seal Including An Epoxy Resin Cured With A Cycloaliphatic Amine," all of which are hereby incorporated herein by reference in their entirety including all references incorporated and/or cited therein.

For purposes of the present disclosure, and as will be explained in greater detail herein below, electrochromic medium 124 typically comprises at least one solvent (e.g., 1, 2, 3, 4, 5, 10, etc.), at least one anodic material (e.g., 1, 2, 3, 4, 5, 10, etc.), at least one cathodic material (e.g., 1, 2, 3, 4, 5, 10, etc.), and a creep resistant crosslinked polyelectrolyte gel matrix. It will be understood that regardless of its ordinary meaning, the term "creep resistant" will be defined herein as resistance sufficient to materially slow and/or eliminate deformation of the electrochromic medium under the constant forces of the earth's gravitational field and/or any other physical force a device experiences during normal operation, which results in an alteration of the device's cell spacing that is visibly appreciable. It will be further understood that regardless of its ordinary meaning, the term "polyelectrolyte" gel will be defined herein as a polymer gel that has ionic groups covalently incorporated into the polymer gel matrix.

Typically both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference.

Electrochromic medium 124 is preferably chosen from one of the following categories:

(1) Single-layer, single-phase—The electrochromic medium may comprise a single-layer of material which may include small non-homogenous regions and includes solution-phase devices where a material may be contained in solution in an ionically conducting electrolyte which remains in solution in the electrolyte when electrochemically oxidized or reduced. Solution phase electroactive materials may be contained in the continuous solution-phase of a gel medium in accordance with the teachings of U.S. Pat. No. 5,928,572 entitled "Electrochromic Layer And Devices Comprising Same," and International Patent Application Serial No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Preselected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Pat. No. 6,519,072 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer such as linking of a color-stabilizing moiety to an anodic and/or cathodic material as described in U.S. Pat. No. 6,188,505 entitled "Color-Stabilized Electrochromic Devices," which is hereby incorporated herein by reference in its entirety including all references incorporated and/or cited therein.

The anodic and cathodic electrochromic materials can also include coupled materials as described in U.S. Pat. No. 6,249,369 entitled "Coupled Electrochromic Compounds With Photostable Dication Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein. Notably, and in a preferred embodiment of the present application, the collective concentration of the cathodic electroactive material(s) is greater than the collective concentration of the anodic electroactive material(s).

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which are hereby incorporated herein by reference in their entirety including all references incorporated and/or cited therein.

(2) Multi-layer—The medium may be made up in layers and includes a material attached directly to an electrically conducting electrode or confined in close proximity thereto which remains attached or confined when electrochemically oxidized or reduced. In accordance with the present invention, one or more layers may contain a polyelectrolyte gel matrix.

In addition, electrochromic medium 124 may comprise other materials, such as light absorbers, light stabilizers, thermal stabilizers, antioxidants, thickeners, viscosity modifiers, tint providing agents, color-stabilizing redox buffers, and mixtures thereof. Suitable redox buffers include, among others, those disclosed in U.S. Pat. No. 6,188,505 entitled "Color-Stabilized Electrochromic Devices," which is hereby incorporated herein by reference in its entirety—including all continuing applications/patents claiming priority therefrom. Suitable UV-stabilizers may include: the material ethyl-2-cyano-3,3-diphenylacrylate, sold by BASF of Parsippany, N.Y., under the trademark Uvinul N-35 and by Aceto Corp., of Flushing, N.Y., under the trademark Viosorb 910; the material (2-ethylhexyl)-2-cyano-3,3-diphenylacrylate, sold by BASF under the trademark Uvinul N-539; the material 2-(2-hydroxy-5-methylphenyl)benzotriazole, sold by Ciba-Geigy Corp. under the trademark Tinuvin P; the material 3-[3-(2H-benzotriazole-2-yl)-5-(1,1-dimethylethyl)-4-hydroxyphenyl]propionic acid pentyl ester prepared from Tinuvin 213, sold by Ciba-Geigy Corp., via conventional hydrolysis followed by conventional esterification (hereinafter "Tinuvin PE"); the material 2,4-dihydroxybenzophenone sold by, among many others, Aldrich Chemical Co.; Tinuvin 384 sold by Ciba-Geigy Corp.; the material 2-hydroxy-4-methoxybenzophenone sold by American Cyanamid under the trademark Cyasorb UV 9; and the material 2-ethyl-2'-ethoxy-oxanilide sold by Sandoz Color & Chemicals under the trademark Sanduvor VSU—to name a few.

For purposes of the present invention, anodic materials may include any one of a number of materials including ferrocene, substituted ferrocenes, substituted ferrocenyl salts, phenazine, substituted phenazines, phenothiazine, substituted phenothiazines including substituted dithiazines, thianthrene, and substituted thianthrenes. Examples of anodic materials may include di-tert-butyl-diethylferrocene, 5,10-dimethyl-5,10-dihydrophenazine (DMP), 3,7,10-trimethylphenothiazine, 2,3,7,8-tetramethoxy-thianthrene, 10-methylphenothiazine, tetramethylphenazine (TMP)—see U.S. Pat. No. 6,242,602 B1 for synthesis, which is hereby incorporated herein by reference in its entirety, and bis(butyltriethylammonium)-para-methoxytriphenodithiazine (TPDT)—see synthesis of 3,10-dimethoxy-7,14-(triethylammoniumbutyl)-triphenodithiazinebis(tetrafluoroborate) in U.S. Pat. No. 6,710,906 B2, which is hereby incorporated herein by reference in its entirety. It is also contemplated that the anodic material may comprise a polymer film, such as polyaniline, polythiophenes, polymeric metallocenes, or a solid transition metal oxide, including, but not limited to, oxides of vanadium, nickel, iridium, as well as numerous heterocyclic compounds, etcetera. It will be understood that numerous other anodic materials are contemplated for use including those disclosed in U.S. Pat. No. 4,902,108 entitled "Single-Compartment, Self-Erasing, Solution-Phase Electrochromic Devices, Solutions For Use Therein, And Uses Thereof," as well as U.S. Pat. No. 6,188,505 entitled "Color-Stabilized Electrochromic Devices," U.S. Pat. No. 6,710,906 B2 entitled "Controlled Diffusion Coefficient Electrochromic Materials For Use In Electrochromic Mediums And Associated Electrochromic Devices," and U.S. Pat. No. 7,428,091 B2 entitled "Electrochromic Compounds And Associated Media And Devices," all of which are hereby incorporated herein by reference in their entirety including all references incorporated and/or cited therein.

Cathodic materials may include, for example, viologens, such as methyl viologen tetrafluoroborate, octyl viologen tetrafluoroborate (octylviologen), or benzyl viologen tetrafluoroborate, ferrocinium salts, such as (6-(tri-tert-butylferrocinium)hexyl)triethylammonium di-tetrafluoroborate (TT-BFc$^+$)—see U.S. Pat. No. 7,046,418 entitled "Reversible Electrodeposition Devices and Associated Electrochemical Media" for synthesis which is hereby incorporated herein by reference in its entirety. It will be understood that the preparation and/or commercial availability for each of the above-identified cathodic materials is well known in the art. See, for example, "The Bipyridinium Herbicides" by L.A. Summers (Academic Press 1980). While specific cathodic materials have been provided for illustrative purposes only, numerous other conventional cathodic materials are likewise contemplated for use including, but by no means limited to, those disclosed in previously referenced U.S. Pat. No. 4,902,108, U.S. Pat. No. 6,188,505, U.S. Pat. No. 6,710,906 B2, as well as U.S. Pat. No. 7,855,821 B2 entitled "Electrochromic Compounds And Associated Media And Devices," all of which are hereby incorporated herein by reference in their entirety including all references incorporated and/or cited therein. Moreover, it is contemplated that the cathodic material may comprise a polymer film, such as various substituted polythiophenes, an inorganic film, or a solid transition metal oxide, including, but not limited to, tungsten oxide.

For illustrative purposes only, the concentration of the anodic and/or cathodic materials can range from approximately 1 millimolar (mM) to approximately 500 mM and more preferably from approximately 2 mM to approximately 100 mM.

For purposes of the present disclosure, a solvent of electrochromic polyelectrolyte gel medium 124 may comprise any one of a number of common, commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; propylene carbonate (PC), ethylene carbonate; and homogenous mixtures of the same. While specific solvents have been disclosed as being associated with the electrochromic medium, numerous other solvents that would be known to those having ordinary skill in the art having the present disclosure before them are likewise contemplated for use.

In one aspect of the present invention a plug fills a fill port which is associated with first substrate 112, second substrate 114, and/or sealing member 122, and which preferably comprises an epoxy resin or mixture of resins (or other resins provided herein) and which is at least partially cured with a cationic photoinitiating antimonate salt and/or comprises an antimonate toward enhancing durability of the plug and/or compatibility of the same with electrochromic medium 124 and/or external atmospheric conditions. Such enhanced durability and/or compatibility preferably reduces the likelihood of any materials within electrochromic medium 124 being compositionally compromised and/or from inadvertently leaking out of chamber 116 through the fill port.

It will be understood that during normal fabrication of variable transmission electrochromic device 100, the fill port is utilized to introduce electrochromic medium 124 into chamber 116 of variable transmission electrochromic device 100. In certain embodiments partially fabricated variable transmission electrochromic device 100 is placed with the fill port downward in an empty container or trough in a vacuum vessel and evacuated. Electrochromic medium 124 is introduced into the trough or container in a manner such that the fill port is submerged. The vacuum vessel is then backfilled, which forces electrochromic medium 124 through the fill port and, ultimately, into chamber 116. In certain other embodiments, such as an aircraft transparency, partially fabricated variable transmission electrochromic device 100 is placed with the fill port upward in a vacuum vessel and evacuated. Electrochromic medium 124 is introduced into the container via conventional conduit in a manner such that the fill port is not submerged. In one embodiment, the fill port is then plugged with a photo curing epoxy resin, which is at least partially cured with a cationic photoinitiating antimonate salt and/or comprises an antimonate. Such curing is preferably accomplished via a UV lamp. Additional discussions relative to the fabrication process of certain embodiments of variable transmission electrochromic devices 100 are disclosed in U.S. Pat. No. 6,700,692 B2, which has been previously referenced and incorporated herein.

The formulation of the plug may also comprise an epoxy resin or mixture of resins (e.g. cycloaliphatic epoxy resins including, for example, Omnilane OC1005, which is available from IGM Resins Inc., Bartlett, Ill., aromatic epoxy resins including, for example, Bis-F, Bis-A, and/or epoxy novolac resins including, for example, DER 354, DER 332, and DEN 431, which are all available from the Dow Chemical Company—all of which may be optionally filled with fumed silica or other fillers such as glass beads, calcium carbonate, aluminum oxide, calcium fluoride, or other fillers as desired) which are at least partially cured using one or more antimonate photo initiators, such as, for example, a sulfonium antimonate, an arylsulfonium antimonate, a triarylsulfonium antimonate, a triarylsulfonium hexafluoroantimonate, and a mixed triarylsulfonium hexafluoroantimonate, and combinations thereof.

While specific anionic salts of photo initiators have been disclosed, for illustrative purposes only, it will be understood that any one of a number of other anions are contemplated for use in accordance with the present invention, including, for example, $AsF_6$, $Ga(C_6F_5)_4$, etcetera.

The formulation of the plug may also comprise a resin or mixture of resins (e.g., epoxy resins, such as epoxidized polybutadienes, epoxidized castor oil, epoxidized cashew nut oil, acrylated butadiene resins, among other provided herein) that are substantially insoluble and/or substantially immiscible with an associated electrochromic medium 124 while in the uncured state. By way of supporting example, the resin or mixture of resins may comprise Sartomer CN-301, Sartomer CN-304, Rhan BR-643.

For purposes of the present invention it will be understood that resins other than acrylated (Sartomer CN-301), methacrylated (Sartomer CN-304) or epoxidized polybutabiene can be used in a plug formulation that are at least substantially insoluble and/or at least substantially immiscible in the EC media. Other insoluble monomers or oligomers available from Sartomer include CN-986 (aliphatic urethane acrylate), CN-2252 (polyester acrylate), CN-934 (aliphatic urethane acrylate), CN-975 (hexafunctional urethane acrylate), CN-965 (aliphatic urethane acrylate), CN-981 (aliphatic urethane acrylate)CN-973 (aromatic urethane acrylate), SR-489 (tridecyl acrylate) and SR-335 (lauryl acrylate)—just to name a few.

The plug may also comprise two-parts, namely; a first sub-component comprising a resin or mixture of resins (e.g., epoxy resins, acrylated butadiene resins, among other provided supra and infra) that are substantially insoluble and/or substantially immiscible with an associated electrochromic medium (i.e., medium 124) while in the uncured state, and a second-subcomponent comprising a resin or mixture of resins (e.g., epoxy resins, urethane resins, phenolic resins, acrylic resins, cured at room temperature, thermally and/or with radiation, among others provided supra and infra) that exhibit desired low permeability, adhesion, and/or stability characteristics. In particular, the permeability of the second-sub-component will preferably protect electrochromic medium 124 from air and/or moisture if the first-subcomponents exhibit permeability to air and/or moisture. Furthermore, the second-subcomponent will preferably adhere to at least the first-subcomponent toward maintaining device integrity over long periods of time—including one or more decades depending upon the application of the particular variable transmission electrochromic device.

Additional non-limiting examples of resins that are suitable for use as second-subcomponent resins and/or resins cured with an antimonate photo initiator include conventional aliphatic amines, cycloaliphatic amines, amidoamines, mercaptans, cycloaliphatic epoxy resins such as Omnilane OC1005, which is available from IGM Resins Inc., Bartlett, Ill., aromatic epoxy resins such as Bis-F, Bis-A, and/or epoxy novolac resins such as DER 354, DER 332, and DEN 431, which are all available from the Dow Chemical Company, as well as thermal and/or photo-initiators, and optionally filled with fumed silica or other fillers such as glass beads, calcium carbonate, aluminum oxide, carbon black, etcetera, using conventional techniques.

It will be understood that the first sub-component of the plug can be introduced into the fill port which is generally compatible with the components of electrochromic medium 124 and subsequently cured. Next, the outer surface of the first sub-component and surrounding area can be cleaned, or cleaned and etched, if desired, prior to association of the second sub-component. Etching can be accomplished by several methods including mechanical etching such as sandblasting, sandpaper, and chemical etching—just to name a few etching techniques. After optionally etching, the second sub-component of the plug can be associated with the outer surface area of the first sub-component and the surrounding area which is generally compatible with external atmospheric conditions/parameters.

In accordance with the present invention, the plug may also optionally comprise one or more cure indicators which provide optical and/or measurable indication of the degree of plug curing. A first class of cure indicators preferably includes pH based cure indicators, such as phenolphthalein (0.25-0.5 parts per hundred resin "phr") and thymolphthalein (0.25-0.5 phr), which are available from Sigma-Aldrich Chemical Co., of St. Louis, Mo. A second class of cure indicators preferably includes free radical/reactive cure indicators such as Crystal Violet (0.25-0.5 phr), which is available from Sigma-Aldrich Chemical Co. A third class of cure indicators preferably includes UV cure indicators such as Blue 55 (1-5 phr), which is available from Spectra Group Limited, Inc., Millbury, Ohio. It will be understood that the concentrations of cure indicators provided above are merely preferred operative concentrations, but are, in no way, limiting. To be sure, other concentrations that would be known to those having ordinary skill in the art are likewise contemplated for use in accordance with the present invention. It will be further understood that utilization of plug cure indicators to the formulation is advantageous in a production setting to insure that the plug has been exposed to UV light and/or is in a properly cured state.

The plug may further optionally comprise one or more additives, such as, but not limited to, tougheners (e.g. Fortegra 100 (1-5 wt %) available from The Dow Chemical Company and MX136 core-shell toughener (25 wt % in Bis-F epoxy) available from Kaneka Corporation, Pasedena, Tex.), flexibilizers/crosslinkers (e.g. H2003 dendritic polymer (1-20 wt %) or CAPA polyols (1-20 wt %) available from Perstorp Polyols, Inc, Toledo, Ohio), and/or surface active agents (e.g. UV3570 (0.5-2.5 wt %) available from BYK-Chemie, Germany). It will be understood that plug tougheners and flexibilizers/crosslinkers are functionally self-explanatory, and that surface active agents can reduce the surface tension of the plug formulation and help repel the electrochromic medium during the plugging operation and reduce intermixing. It will be understood that numerous other plug materials and/or configurations are contemplated for use including those disclosed in U.S. Pat. No. 7,884,995 B2 and U.S. patent application Ser. No. 13/022,912, both of which are entitled "Electrochromic Device Having An Improved Fill Port Plug," and both of which are hereby incorporated herein by reference in their entirety including all references incorporated and/or cited therein.

In accordance with the present invention, electrochromic medium 124 comprises a polyelectrolyte gel matrix which is creep resistant. The polyelectrolyte gel matrix is preferably crosslinked and includes one or more backbones which may be selected from, for example, polyamides, polyimides, polycarbonates, polyesters, polyethers, polymethacrylates, polyacrylates, polysilanes, polysiloxanes, polyvinylacetates, polymethacrylonitriles, polyacrylonitriles, polyvinylphenols, polyvinylalcohols, polyvinylidenehalides, and co-polymers and combinations thereof.

For purposes of the present disclosure, ionic groups are associated with and/or incorporated into the polymer backbone and/or crosslinking group, which then becomes part of the polymer matrix upon crosslinking, and may include one or more quaternary ammonium groups (e.g., [2-(methacryloyloxy)ethyl]trimethylammonium tetrafluoroborate (TMEAMABF4)), one or more phosphonium cation groups, one or more pyridinium groups, one or more imidazolium groups, one or more alkyl trifluoroborate groups, and combinations thereof—etcetera. It will be understood that while specific ionic groups have been disclosed for illustrative purposes only, numerous other ionic groups that would be known to those having ordinary skill in the art having the present disclosure before them are likewise contemplated for use, including those disclosed as solubilizing moieties in U.S. Pat. No. 6,445,486 entitled "Electroactive Materials and Beneficial Agents Having a Solubilizing Moiety" and U.S. Pat. No. 6,262,832 entitled "Anodic Electrochromic Materials Having A Solubilizing Moiety," which are hereby incorporated herein by reference in their entirety. Unlike conventional polymer matrices used in electrochromic devices, the polymer matrices of the present invention preferably include one or more of the above-identified ionic groups which are present in an effective concentration to enable the electrochromic medium to exhibit creep resistance.

In accordance with the present invention, the above-identified polymer backbones are preferably cross-linked with a cross-linking reactant having a cross-linking functional group, such as an isocyanate. While an isocyanate has been disclosed, for illustrative purposes only, as a cross-linking functional group, it will be understood that any one of a number of other cross-linking functional groups that would be known to those with ordinary skill in the art having the present disclosure before them are likewise contemplated for use.

In further accordance with one embodiment of the present invention, and as will be shown in the experiments provided herein below, it has now been discovered that the polyelectrolyte gel matrices, which preferably comprise a product of a first reactant having an ionic group and a second reactant having a cross-linking functional group are capable of enabling creep resistance not previously observed in electrochromic mediums. Without being bound by any one particular theory, it is believed that the polyelectrolyte gel matrices benefit from increased compatibility with the solvent, which in this case is propylene carbonate.

It will be understood that under certain parameters and/or in certain configurations, an electrochromic device containing a gelled polymer matrix medium over extended periods of time shows signs of creep likely due to the earth's gravitational force, which will manifests itself in a change of the device's cell spacing uniformity. This uniformity change is believed to be due in part to a redistribution of the solvent within the crosslinked polymer gel. In further accordance with an embodiment of the present invention, and as will be shown in the experiments provided herein below, it has now been discovered that the polyelectrolyte gel matrices, which preferably comprise a chemically crosslinked polymer network that contains ionic groups of a particular sign chemically bonded to the polymer network plus the associated counter-ions, show increase resistance to material creep with time. It is known in the literature that polyelectrolyte polymers and gels can have particularly strong affinity towards polar solvents, for example, superabsorbent polymers are polyelectrolyte polymers that may absorb up to several hundred times their own weight with a solvent. Without being bound to any one particular theory, the creep resistance of the crosslinked polyelectrolyte gel matrix compared to a crosslinked neutral polymer gel matrix at similar concentrations and/or weight percentages can be explained by two important effects. First, an ionized polymer network with like charges attached directly to the polymer backbone will want its individual chains on the network to drift apart and stretch-out because of electrostatic repulsion of these ionic groups, increasing the driving force for solvation of the polyelectrolyte gel matrix. Second, the opposite charged counter-ions, which are regionally bound to the polyelectrolyte because of electro-neutrality reasons, also increase the need for solvation of the crosslinked polyelectrolyte gel matrix with a polar solvent, for example propylene carbonate.

It will be understood that, unless otherwise specified, the chemical reagents and compounds provided herein below, or their precursors, are available from common commercial chemical vendors, such as Sigma-Aldrich Chemical Co., of St. Louis, Mo.

The invention is further described by the following examples.

Example I

Preparation of a Neutral Polyacrylate Polyol in Propylene Carbonate

The neutral polyacrylate polyol copolymer was made from the following two monomers, methyl acrylate (MA) and 2-hydroxyethyl methacrylate (HEMA) via a thermal initiated radical polymerization in a molar ratio of 10 and 1, respectively. The thermal initiator for this polymerization was dimethyl 2,2'-azobisisobutyrate (AIBMe) from Wako Pure Chemical Industries, Ltd., Japan.

First, the two monomers and the initiator were mixed together at the following weight percentages, 86.4, 13.0, and 0.6% for MA, HEMA, and AIBMe, respectively. The monomer solution was slowly added at constant rate to a solution of propylene carbonate (PC) heated to 70° C. During the addition, the reaction mixture was kept at 70° C. while being mechanically stirred and purged with nitrogen gas. The total addition time was six hours. At this point, the amount of PC was about 80% of the total weight of the solution. The solution was then mixed at 70° C. overnight (ca. 18 hours) under nitrogen. On the following day, unreacted MA was distilled off at 95° C. and <2 torr. The solution was cooled to room temperature. Based on the thermogravimetric analysis (TGA) results, the final polymer solution was diluted with PC to make a 15% polymer solution in PC.

Example II

Preparation of 2-(methylacryloyloxy)ethyl trimethylammonium tetrafluroborate (TMEAMABF4)

1,162 grams of a 20% solution of sodium tetrafluoroborate in water was heated to about 50° C. With agitation, 379 grams of an 80% aqueous solution of 2-(methylacryloyloxy)ethyl trimethylammonium methylsulfate (Sigma-Aldrich) was slowly mixed with the tetrafluoroborate solution. The solution was allowed to cool without agitation to room temperature and was then stored in a refrigerator overnight. On the following day, a white solid was filtered from the solution and then dried under vacuum for about 24 hours. 217 grams of dry 2-(methylacryloyloxy)ethyl trimethylammonium tetrafluroborate was collected.

Example III

Preparation of a Polyelectrolyte Polyacrylate Polyol in Propylene Carbonate

The polyelectrolyte polyacrylate polyol was made from three monomers, methyl acrylate (MA), 2-(methylacryloyloxy)ethyl trimethylammonium tetrafluroborate made in Example II (TMEAMABF4), and 2-hydroxyethyl methacrylate (HEMA) via a thermal initiated radical polymerization in a molar ratio of 8, 2, and 1, respectively. This polymer is similar to the one in Example I, except 20% of the MA, on a molar base, was removed and substituted with TMEAMABF4. The thermal initiator for this polymerization was dimethyl 2,2'-azobisisobutyrate (AIBMe) from Wako Pure Chemical Industries, Ltd., Japan.

For this polymerization, 948 grams of propylene carbonate (PC) was placed in a jacketed one liter reactor and heated to 70° C. under a nitrogen atmosphere. In a separate flask, 168.5 grams of MA, 31.8 grams of HEMA, 126.7 grams of TMEAMABF4, 1.48 grams of AIBMe and 360 grams of PC were mixed together. The monomer solution was placed in an addition funnel. Over approximately a 4 hour period, the monomer solution was added to the 70° C. PC solution at a constant rate. During this monomer addition, the reaction temperature was held constant at 70° C. The solution was then further mixed at 70° C. overnight under a nitrogen atmosphere. On the following day, 0.15 grams of AIBMe and 8.4 grams of PC were mixed and then added to the reaction mixture. Unreacted MA was distilled off under reduced pressure and 90° C. The solution was cooled and 534 grams of PC was added to the polymer solution and mixed. By thermogravimetric analysis (TGA), the polymer was 14.24% of the solution.

Example IV

Preparing Windows for Creep Testing

Using an electrochromic gel fluid, windows were made for creep testing.

These window elements were oval in shape, approximately 20 inches long and 12 inches wide. The elements were made by attaching two sheets of 0.95 mm soda lime glass together, which were previously coated with tin doped indium oxide (ITO). The two sheets of glass were then attached with a thermally cured, non-conductive epoxy. This epoxy was placed around the outside edge of the window, no more than ⅜ of an inch from the edge of the glass. The ITO surfaces were facing one another at about 500 to 550 micrometers apart. There were also two traces of cured conductive epoxy around the outside, no more than ¼ inches from the edge, one was in contact with each of the ITO surfaces and electrically isolated from one another. In one corner of the window, a small hole had been previously drilled. This hole was about ½ inch from the edge of the glass. The hole was used to introduce the electrochromic medium into the window, between the two sheets of glass. After the electrochromic medium was added to the window, the hole was plugged with a UV-curable resin. The windows were placed on a flat surface horizontally and allowed to gel over approximately two days.

Example V

Construction of an Electrochromic Window with a 5% Neutral Polyacrylate Gel

Sufficient quantities of the following electrochromic medium were prepared and placed into two windows described in Example IV. The solution was made by dissolving the following constituents in a propylene carbonate (PC) solvent: 27 mM of 1,1'-dioctyl-4,4'-dipyridinium tetrafluroborate, 15 mM of Tinuvin 384 (Ciba), 30 mM pentyl 3-(3-tert-butyl-4-hydroxy-5-(2H-benzotriazol-2-yl))propionate, 0.341% by weight 4,4'-methylene bis(phenylisocyanate) (MDI), 22.5 mM of 5,10-dihydro-5,10-bis(2,2-dimethylpropyl) phenazine, 3.25 mM of 5,10-dihydro-5,10-bis(2,2-dimethylpropyl) 2,7-bis(2-ethylbutyl) phenazine, 1.0 mM decamethyl ferrocenium tetrafluroborate, 0.50 mM decamethyl ferrocene, 33.3% by weight polymer solution from example 1 and 1.0 parts-per-million of dibutyltin diacetate. The final polymer concentration in the electrochromic medium was 5%.

Example VI

Construction of an Electrochromic Window with a 5% Polyelectrolyte Polyacrylate Gel Sufficient quantities of the following electrochromic medium were prepared and placed into two windows described in Example IV. The solution was made by dissolving the following constituents in a propylene carbonate (PC) solvent: 33 mM of 1,1'-dioctyl-4,4'-dipyridinium tetrafluroborate, 15 mM of Tinuvin 384 (Ciba), 30 mM pentyl 3-(3-tert-butyl-4-hydroxy-5-(2H-benzotriazol-2-yl))propionate, 0.282% by weight 4,4'-methylene bis(phenylisocyanate) (MDI), 22.5 mM of 5,10-dihydro-5,10-bis(2,2-dimethylpropyl) phenazine, 3.25 mM of 5,10-dihydro-5,10-bis(2,2-dimethylpropyl) 2,7-bis(2-ethylbutyl) phenazine, 1.0 mM decamethyl ferrocenium tetrafluroborate, 0.50 mM decamethyl ferrocene, 35.7% by weight polymer solution from example 3 and 2.0 parts-per-million of dibutyltin diacetate. The final polymer concentration in the electrochromic medium was 5%.

Example VII

Accelerated Creep Testing of Electrochromic Windows

Figure 2:
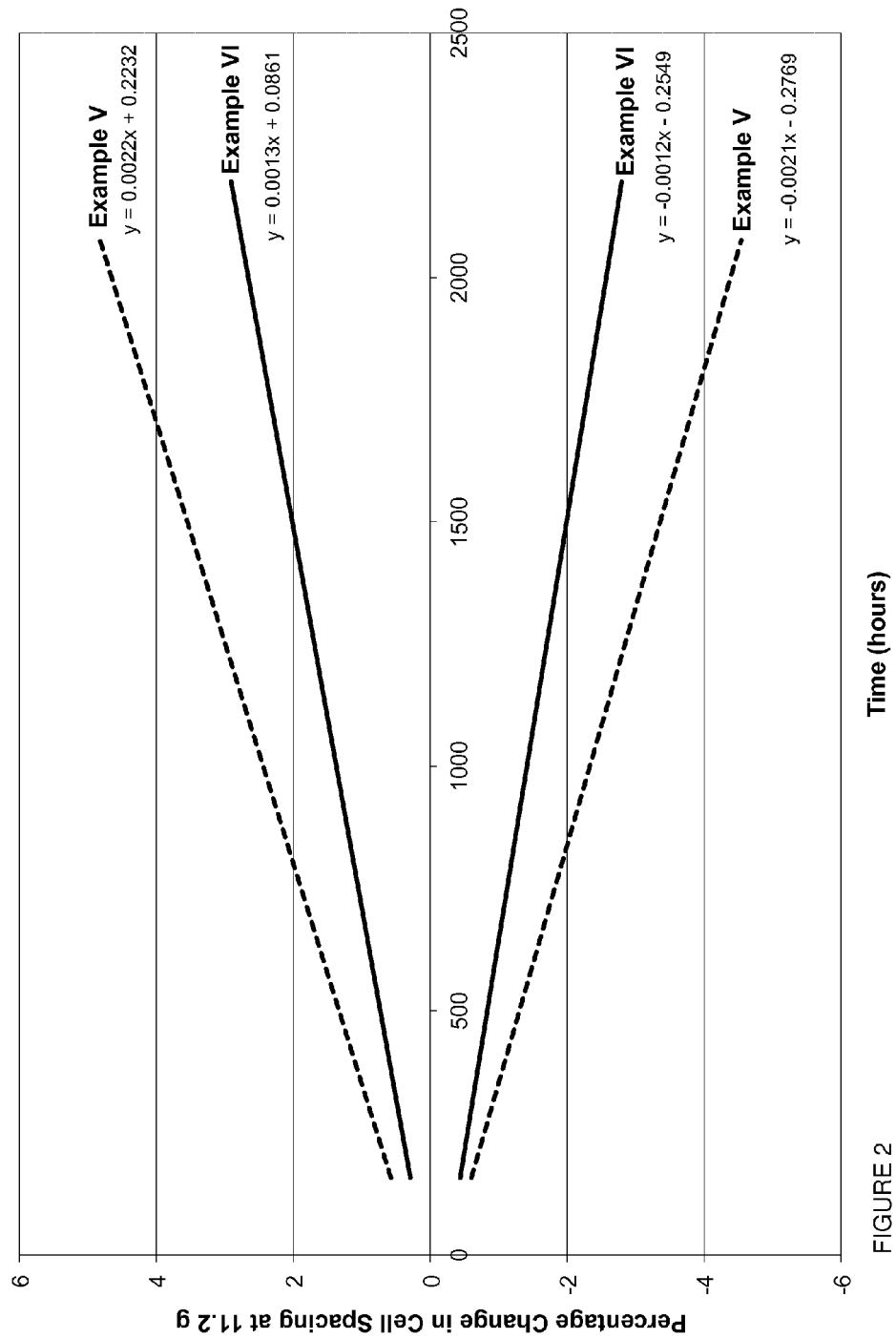
FIG. 2 of the drawings is a two-dimensional plot showing the percentage change in cell spacing as a function of time for Example VII.

Two windows from Example V and two windows from Example VI were subjected to centrifugal longitudinal force that was parallel to the length of the window. This force induced a change in the cell spacing of the window, which was monitored by periodical measurements of the distance between the two pieces of ITO coated glass using a Keyence LT-9030 displacement sensor. The points of maximum cell space change are about two inches from the top of the window (decreasing cell spacing) and two inches from the bottom of the window (increasing cell spacing). Both points are also along the center vertical line on the face of the windows. This cell spacing change was monitored and plotted on FIG. 2 for both sets of windows. As is shown in FIG. 2, the polyelectrolyte gel matrix exhibits significantly less change in cell spacing than the neutral network gel matrix. It will be understood that at least two windows from Example V and at least two windows from Example VI were subjected to an 11.2 g centrifugal longitudinal force that was parallel to the length of the window. This 11.2 g centrifugal longitudinal force was calculated for the center of the window, with 12.8 g and 9.52 g centrifugal longitudinal forces being placed on the bottom and top edges of the window, respectively.

Example VIII

Construction of an Electrochromic Window with a 5.5% Neutral Polyacrylate Gel Sufficient quantities of the following electrochromic medium were prepared and placed into four windows described in Example IV. The solution was made by dissolving the following constituents in a propylene carbonate (PC) solvent: 27. 8 mM of 1,1'-bis(2-ethylhexyl)-4,4'-dipyridinium tetrafluroborate, 15 mM Tinuvin 384 (Ciba), 30 mM pentyl 3-(3-tert-butyl-4-hydroxy-5-(2H-benzotriazol-2-yl)) propionate, 0.375% by weight 4,4'-methylene bis(phenylisocyanate) (MDI), 22.5 mM of 5,10-dihydro-5,10-bis(2,2'-dimethylpropyl) phenazine, 3.25 mM of 5,10-dihydro-5,10-bis (2,2-dimethylpropyl) 2,7-bis(2-ethylbutyl) phenazine, 1.0 mM decamethyl ferrocenium tetrafluoroborate, 0.50 mM decamethyl ferrocene, 36.7% by weight polymer solution from example 1 and 0.50 parts-per-million of dibutyltin diacetate. The final polymer concentration in the electrochromic medium was 5.5%.

Example IX

Preparation of 1,1'-bis((((4-methyl-3-isocyanoanilino)carbonyl)oxy)ethyl)-4,4'-bipyridinium bis (hexafluorophosphate) and Isomers A mixture of 4,4'-bipyridine (55 grams, 0.35 mol) and 2-bromoethanol (180 grams, 1.44 mol) in 800 mL of acetonitrile was heated to refluxing temperature while agitating the solution. After about four hours, the solution was cooled to room temperature and an off-white solid was filtered out of the solution. This solid was washed three times with cold acetonitrile (100 mL/each), then air dried. The bromide salt was recrystallized twice from ethanol/water, then dried leaving 102 grams of the desired bis(2-hydroxyethyl)-4,4'-bipyridinium dibromide product.

A metathesis procedure was used to convert the bromide salt to a hexafluorophosphate salt. Metathesis procedure: 102 grams of ammonium hexafluorophosphate was dissolved in 100 mL of water and 102 grams of bis(2-hydroxyethyl)-4,4'-bipyridinium dibromide dissolved in 400 ml of hot water. These two solutions were mixed and stirred for 2 hours at 50° C. The final solution was allowed to cool to room temperature, a white precipitate was filtered out, then washed twice with 100 mL cold water. This white solid was then air dried, followed by a recrystallization from acetone/diethyl ether mixture. This metathesis procedure was repeated twice more on this recrystallized material giving a 70-80% yield of the bis(2-hydroxyethyl)-4,4'-bipyridinium bis(hexafluorophosphate) product.

Next, tolylene-2,4-diisocyanate or TDI (29 grams, 0.166 mol) and a couple drops of dibutyltin diacetate catalyst are mix in 30 ml of dry acetonitrile. Over 2½ hours, a solution of bis(2-hydroxyethyl)-4,4'-bipyridinium bis(hexafluorophosphate) in 25 mL dry acetonitrile is slowly pumped into the TDI solution at the rate of about 0.2 mL/minute under dry nitrogen atmosphere with agitation. The solution was allowed to stir at room temperature for an additional one hour after the addition was complete and then was filtered through a Schlenk filter. To the filtrate, 250 mL dried diethyl ether was added, resulting in a light yellow precipitate to form. This precipitate was filtered out using a Schlenk filter. The solid material was washed with dry diethyl ether and vacuum dried. The final product was purified by first dissolving it in dry acetonitrile in a Schlenk flask under dry nitrogen atmosphere, followed by the addition of dry diethyl ether to precipitate final product. This precipitate was filtered through a Schlenk filter, followed by washing with diethyl ether and vacuum drying.

Example X

Construction of a Electrochromic Window with a 5.5% Neutral Polymer and Charged Crosslinker 1,1'-bis((((4-methyl-3-isocyanoanilino)carbonyl)oxy)ethyl)-4,4'-bipyridinium bis(hexafluorophosphate)

Sufficient quantities of the following electrochromic medium were prepared and placed into four windows described in Example IV. The solution was made by dissolving the following constituents in a propylene carbonate (PC) solvent: 20.0 mM of 1,1'-bis(2-ethylhexyl)-4,4'-dipyridinium tetrafluroborate, 15 mM Tinuvin 384 (Ciba), 30 mM pentyl 3-(3-tert-butyl-4-hydroxy-5-(2H-benzotriazol-2-yl))propionate, 22.5 mM of 5,10-dihydro-5,10-bis(2,2'-dimethylpropyl) phenazine, 3.25 mM of 5,10-dihydro-5,10-bis(2,2-dimethylpropyl) 2,7-bis(2-ethylbutyl) phenazine, 1.0 mM decamethyl ferrocenium tetrafluoroborate, 0.50 mM decamethyl ferrocene, 36.7% by weight polymer solution from example 1, 1.33% by weight 1,1'-bis((((4-methyl-3-isocyanoanilino)carbonyl)oxy)ethyl)-4,4'-bipyridinium bis(hexafluorophosphate) (example 9) and 0.50 parts-per-million of dibutyltin diacetate. The final crosslinked polyelectrolyte gel matrix concentration in the electrochromic medium was 5.5%.

Example XI

Accelerated Creep Testing of Windows from Example VIII and X

Figure 3:
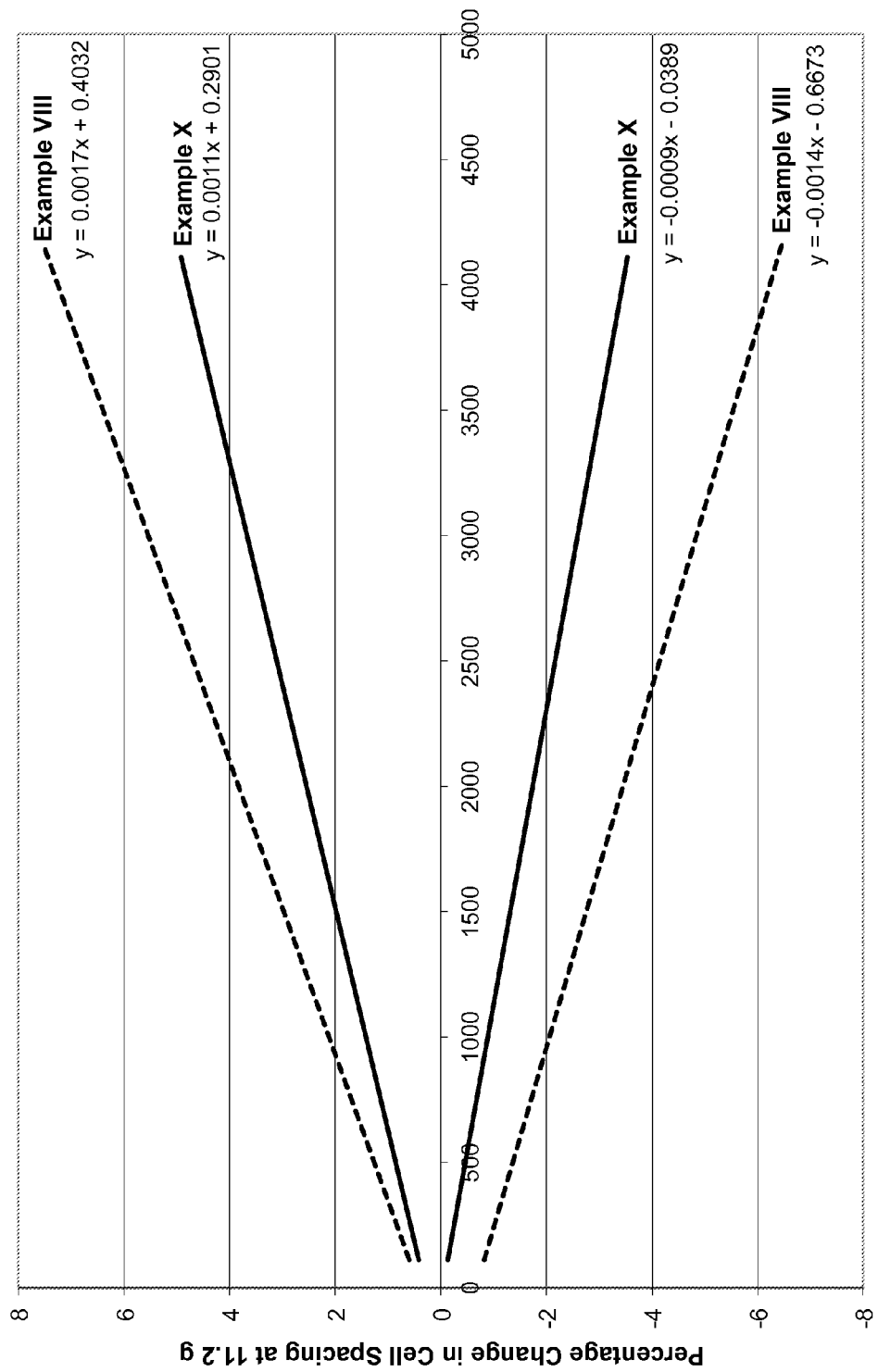
FIG. 3 of the drawings is a two-dimensional plot showing the percentage change in cell spacing as a function of time for Example XI.

Two windows from example VIII and two windows from example X were subjected to the same 11.2 g centrifugal longitudinal force and cell spacing measurements that are described in example VII. The cell spacing change was monitored and plotted on FIG. 3 for both sets of windows. As is shown in FIG. 3, the neutral polymer that is cross linked with the charged isocyanate crosslinker (example IX) exhibits significantly less change in cell spacing than the gel matrix that is crosslink with a neutral diisocyanate (MDI).

Example XII

Preparation of N,N'-bis(11-hydroxyundecyl)-N,N,N',N'-tetramethyl ethylenediammonium bis(tetrafluoroborate)

N,N,N',N'-tetramethyl ethylenediamine (20 grams, 0.172 mol) and 11-bromoundecanol (100 grams, 0.398 mol) were dissolved in 2 liters of acetonitrile in a round bottom flask equipped with a condenser. This mixture was then agitated and heated under a nitrogen atmosphere to a refluxing temperature. After 48 hours of heating, the desired bromide product precipitated out of solution. The reaction mixture was cooled to room temperature and the precipitate filtered out, followed by three washing with 100 mL of chilled acetonitrile. The product was then recrystallized twice from an ethanol/water mixture.

A metathesis procedure was used to convert this bromide salt to a tetrafluoroborate salt. Metathesis procedure: 75 grams of bromide salt was dissolved in 400 mL hot water, followed by the slow addition of 300 grams of a 40% by weight mixture of sodium tetrafluoroborate in water. This mixture was stirred and heated at 90° C. for 2 hours. The solution was then cooled and a solid precipitate was filtered out. This precipitate was then washed twice with 100 mL of cold water, followed by air drying. This metathesis procedure was repeated twice more to give the final product, with a 70-80% yield.

Example XIII

Construction of an Electrochromic Window with N,N'-bis(11-hydroxyundecyl)-N,N,N',N'-tetramethyl ethylenediammonium bis(tetrafluoroborate) (Example XII) and a Polyfunctional Isocyanate (HDT)

Sufficient quantities of the following electrochromic medium were prepared and placed into four windows described in Example IV. The solution was made by dissolving the following constituents in a propylene carbonate (PC) solvent: 34.0 mM of 1,1'-bis(2-ethylhexyl)-4,4'-dipyridinium tetrafluroborate, 15 mM Tinuvin 384 (Ciba), 30 mM pentyl 3-(3-tert-butyl-4-hydroxy-5-(2H-benzotriazol-2-yl))propionate, 2.11% by weight Basonat HI 100, a polyfunctional isocyanate produced by BASF and is a 22.5 mM of 5,10-dihydro-5,10-bis(2,2'-dimethylpropyl) phenazine, 3.25 mM of 5,10-dihydro-5,10-bis(2,2-dimethylpropyl) 2,7-bis(2-ethylbutyl) phenazine, 1.0 mM decamethyl ferrocenium tetrafluoroborate, 0.50 mM decamethyl ferrocene, 3.75% by weight of charged diol from example 12 and 20 parts-per-million of dibutyltin diacetate. The final weight percentage of polymer matrix, plus tetrafluoroborate counter ions, was 5.86% in the electrochromic medium. This was the same total weight percentage of the copolymer and MDI in example VIII.

Example XIV

Accelerated Creep Testing of Windows from Examples VIII and XIII

Figure 4:
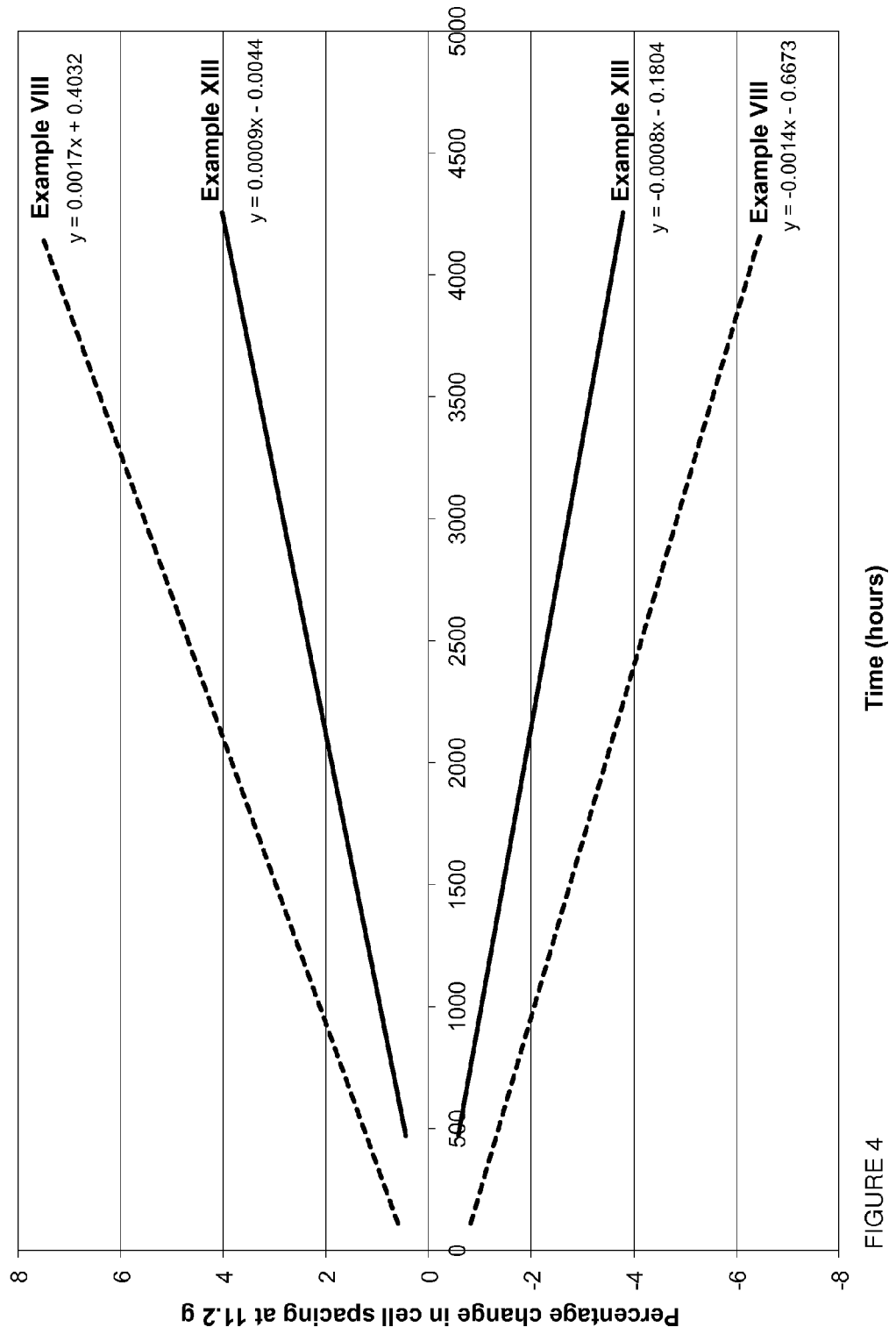
FIG. 4 of the drawings is a two-dimensional plot showing the percentage change in cell spacing as a function of time for Example XIV.

At least two windows from example VIII and two from example XIII were subjected to the same 11.2 g centrifugal longitudinal force and cell spacing measurements that are described in example VII. The cell spacing change was monitored and plotted on FIG. 4 for both sets of windows. As is shown in FIG. 4, the windows made in example XIII exhibits significantly less change in cell spacing than the neutral gel matrix that is crosslink with a neutral diisocyanate (MDI).

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed and desired to be secured by Letters Patent of the United States is:

1. An electrochromic device, comprising:
   a first substantially transparent substrate having an electrically conductive material associated therewith;
   a second substrate having an electrically conductive material associated therewith; and
   an electrochromic medium contained within a chamber positioned between the first and second substrates which comprises:
   at least one solvent;
   at least one anodic electroactive material;
   at least one cathodic electroactive material;
   wherein at least one of the anodic and cathodic electroactive materials is electrochromic; and
   a crosslinked polyelectrolyte gel matrix, wherein the crosslinked polyelectrolyte gel matrix increases creep resistance of the electrochromic medium relative to a non-charged gel matrix at the same concentration.

2. The electrochromic device according to claim 1, wherein the electrochromic device exhibits an absolute value of percentage change in cell spacing of less than approximately 1.00% after being exposed to 11,000 centrifugal Gals$_{(L)}$ for 500 hours.

3. The electrochromic device according to claim 1, wherein the electrochromic device exhibits an absolute value of percentage change in cell spacing of less than approximately 3.75% after being exposed to 11,000 centrifugal Gals$_{(L)}$ for 750 hours.

4. The electrochromic device according to claim 1, wherein the electrochromic device exhibits an absolute value of percentage change in cell spacing of less than approximately 2.50% after being exposed to 11,000 centrifugal Gals$_{(L)}$ for 750 hours.

5. The electrochromic device according to claim 1, wherein the electrochromic device exhibits an absolute value of percentage change in cell spacing of less than approximately 4.00% after being exposed to 11,000 centrifugal Gals$_{(L)}$ for 1,000 hours.

6. The electrochromic device according to claim 1, wherein the electrochromic device exhibits an absolute value of percentage change in cell spacing of less than approximately 3.00% after being exposed to 11,000 centrifugal Gals$_{(L)}$ for 1,000 hours.

7. The electrochromic device according to claim 1, wherein the electrochromic device exhibits an absolute value of percentage change in cell spacing of less than approximately 6.00% after being exposed to 11,000 centrifugal Gals$_{(L)}$ for 1,500 hours.

8. The electrochromic device according to claim 1, wherein the electrochromic device exhibits an absolute value of percentage change in cell spacing of less than approximately 5.00% after being exposed to 11,000 centrifugal Gals$_{(L)}$ for 1,500 hours.

9. The electrochromic device according to claim 1, wherein the electrochromic device exhibits an absolute value of percentage change in cell spacing of less than approximately 8.00% after being exposed to 11,000 centrifugal Gals$_{(L)}$ for 1,750 hours.

10. The electrochromic device according to claim 1, wherein the electrochromic device exhibits an absolute value of percentage change in cell spacing of less than approximately 5.00% after being exposed to 11,000 centrifugal Gals$_{(L)}$ for 1,750 hours.

11. The electrochromic device according to claim 1, wherein the electrochromic medium further comprises an ultraviolet stabilizer.

12. The electrochromic device according to claim 1, wherein the electrochromic medium further comprises at least one of an anodic and a cathodic color-stabilizing redox buffer.

13. The electrochromic device according to claim 1, wherein the electrochromic medium further comprises anodic and cathodic color-stabilizing redox buffers.

14. The electrochromic device according to claim 1, wherein the at least one cathodic electroactive material comprises a viologen.

15. The electrochromic device according to claim 1, wherein the at least one anodic electroactive material comprises a phenazine.

16. The electrochromic device according to claim 1, wherein the at least one solvent comprises propylene carbonate.

17. The electrochromic device according to claim 1, wherein the device is an aircraft transparency.

18. The electrochromic device according to claim 1, wherein the second substrate is plated with a reflective material.

19. The electrochromic device according to claim 18, wherein the reflective material is selected from the group comprising chromium, ruthenium, rhodium, silver, alloys and/or combinations of the same, and/or stacked layers thereof.

20. The electrochromic device according to claim 19, wherein the device is an electrochromic mirror.

21. The electrochromic device according to claim 1, wherein the second substrate is substantially transparent.

22. The electrochromic device according to claim 21, wherein at least one of the first and second substrates is less than approximately 1 mm thick.

23. The electrochromic device according to claim 22, wherein the device is an aircraft transparency.

24. The electrochromic device according to claim 21, wherein the device is an electrochromic window.

* * * * *